(12) United States Patent
Wang et al.

(10) Patent No.: US 12,573,551 B2
(45) **Date of Patent: *Mar. 10, 2026**

(54) IRON-RICH PERMANENT MAGNET

(71) Applicant: REGENTS OF THE UNIVERSITY OF MINNESOTA, Minneapolis, MN (US)

(72) Inventors: Jian-Ping Wang, Shoreview, MN (US); Md Mehedi, Minneapolis, MN (US); YanFeng Jiang, Minneapolis, MN (US); Bin Ma, Roseville, MN (US); Delin Zhang, Minneapolis, MN (US); Fan Zhang, Minneapolis, MN (US); Jinming Liu, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/529,331

(22) Filed: Dec. 5, 2023

(65) Prior Publication Data

US 2024/0112855 A1    Apr. 4, 2024

Related U.S. Application Data

(63) Continuation of application No. 16/423,516, filed on May 28, 2019, now Pat. No. 11,875,934.

(Continued)

(51) Int. Cl.
*C01B 21/06* (2006.01)
*C22C 38/00* (2006.01)
(Continued)

(52) U.S. Cl.
CPC ..... *H01F 41/0253* (2013.01); *C01B 21/0622* (2013.01); *H01F 1/10* (2013.01);
(Continued)

(58) Field of Classification Search
CPC ........... C01B 21/0622; C21D 2201/05; C22C 38/001; C22C 2202/02; H01F 1/0009;
(Continued)

(56) References Cited

U.S. PATENT DOCUMENTS

| | | | |
|---|---|---|---|
| 11,875,934 B2 * | 1/2024 | Wang ................. | H01F 41/0253 |
| 2020/0038951 A1 * | 2/2020 | Wang ........................ | B22F 1/06 |

FOREIGN PATENT DOCUMENTS

| | | | | |
|---|---|---|---|---|
| WO | WO-2016122712 A1 * | 8/2016 | ............. | H01F 1/047 |
| WO | WO-2016122987 A1 * | 8/2016 | ............... | H01F 1/20 |
| WO | WO-2018067926 A1 * | 4/2018 | ................ | B22F 9/20 |

* cited by examiner

*Primary Examiner* — Vanessa T. Luk
(74) *Attorney, Agent, or Firm* — BakerHostetler

(57) ABSTRACT

The disclosure is directed to an iron-nitride material having a polycrystalline microstructure including a plurality of elongated crystallographic grains with grain boundaries, the iron-nitride material including at least one of an $\alpha''$-$Fe_{16}N_2$ phase and a body-center-tetragonal (bct) phase comprising Fe and N. The disclosure is also directed a method producing an iron-nitride material. The method includes some combinations of preparing a raw material comprising iron, carrying out a microstructure build-up by annealing the prepared raw material at an elevated temperature and subsequently quenching the prepared raw material to produce a microstructure build-up material, annealing the microstructure build-up material, reducing the microstructure build-up material in a hydrogen environment, nitriding the reduced material to produce a nitrided material and subsequently quenching the nitrided material to a martensitic transformation temperature, stress annealing the nitrided material, and magnetic field annealing the stress-annealed material.

22 Claims, 10 Drawing Sheets

Related U.S. Application Data

(60)   Provisional application No. 62/677,093, filed on May 28, 2018.

(51)   Int. Cl.

| | |
|---|---|
| *H01F 1/10* | (2006.01) |
| *H01F 41/02* | (2006.01) |
| *C22C 38/06* | (2006.01) |
| *C22C 38/16* | (2006.01) |
| *H01F 1/00* | (2006.01) |
| *H01F 1/03* | (2006.01) |

(52)   U.S. Cl.
CPC .... *C21D 2201/05* (2013.01); *C21D 2211/008* (2013.01); *C22C 38/001* (2013.01); *C22C 38/06* (2013.01); *C22C 38/16* (2013.01); *C22C 2200/04* (2013.01); *C22C 2202/02* (2013.01); *H01F 1/0009* (2013.01); *H01F 1/03* (2013.01)

(58)   Field of Classification Search
CPC . H01F 1/0036; H01F 1/03; H01F 1/04; H01F 1/047; H01F 1/059; H01F 1/10; H01F 7/02
See application file for complete search history.

The bulk magnet after stress annealing

IRON-RICH PERMANENT MAGNET

CROSS-REFERENCE TO RELATED APPLICATIONS

This application is a continuation of U.S. patent application Ser. No. 16/423,516, filed May 28, 2019, which claims the benefit of priority to U.S. Provisional Patent Application Ser. No. 62/677,093, filed May 28, 2018, the entire contents of which are herein incorporated by reference in their entireties.

GOVERNMENT RIGHTS

This invention was made with Government support under contract number DE-AR0000199 awarded by the Department of Energy (DOE), Office of ARPA-E. The government has certain rights to this invention.

TECHNICAL FIELD

The disclosure relates to magnetic materials having elongated grains in bulk format and techniques for producing magnetic materials having elongated grains.

BACKGROUND

Permanent magnets play a role in many electromechanical systems, including, for example, sensors, actuators, electric motors or generators, which may be used in vehicles, wind turbines, and other alternative energy mechanisms. Many permanent magnets in current use include rare earth elements, such as neodymium, which result in high energy products. These rare earth elements are in relatively short supply, and may face increased prices and/or supply shortages in the future. Additionally, some permanent magnets that include rare earth elements are expensive to produce. For example, fabrication of NdFeB and ferrite magnets generally includes crushing material, compressing the material, and sintering at temperatures over 1000° C., all of which contribute to high manufacturing costs of the magnets. Additionally, the mining of rare earth metals can lead to severe environmental deterioration.

BRIEF SUMMARY OF THE INVENTION

The disclosure describes bulk permanent magnets that include $Fe_{16}N_2$ and techniques for forming bulk permanent magnets that include $Fe_{16}N_2$. Bulk $Fe_{16}N_2$ permanent magnets may provide an alternative to permanent magnets that include a rare earth element because $Fe_{16}N_2$ has high saturation magnetization and magnetic anisotropy constant. The high saturation magnetization and magnetic anisotropy constants result in a magnetic energy product that may be higher than rare earth magnets.

In general, the disclosure describes exemplary iron-nitride materials having a polycrystalline microstructure including a plurality of elongated crystallographic grains with grain boundaries, the iron-nitride material including at least one of an $\alpha''$-$Fe_{16}N_2$ phase and a body-center-tetragonal (bct) phase comprising Fe and N.

In one example, the disclosure is directed to an iron-nitride material having a polycrystalline microstructure including a plurality of elongated crystallographic grains with grain boundaries where one or more elongated crystallographic grains have a grain aspect ratio of 1.5 or higher.

In another example, the iron-nitride material includes a martensite structure including any of an $\alpha''$-$Fe_{16}N_2$ phase and a body-center-tetragonal (bct) phase comprising Fe and N.

In another example, the iron-nitride material includes a composition of $Fe_xCu_yB_zAl_w$, wherein: y is in the range of from about 1 wt % to about 8 wt %, z is in the range of from about 0.01 wt % to about 3 wt %, Al is in the range of from about 0.1 wt % to about 10 wt %, and x is a remainder of the composition.

In another example, the iron-nitride material includes an antiferromagnetic phase.

In another example, the iron-nitride material includes: a body-centered-distorted (BCT) region comprising one or more of the elongated crystallographic grains with grain boundaries, wherein the one or more of the elongated crystallographic grains comprises at least one of an $\alpha''$-$Fe_{16}N_2$ phase and a body-centered-tetragonal (bct) phase comprising Fe and N.

In another example, the BCT region is morphologically elongated so that one or more of the grain boundaries form at least in part planar grain boundaries.

The disclosure also describes exemplary methods producing an iron-nitride material, the method including at least some combinations of: preparing a raw material comprising iron; carrying out a microstructure build-up by annealing the prepared raw material at an elevated temperature and subsequently quenching the prepared raw material to produce a microstructure build-up material; annealing the microstructure build-up material; reducing the microstructure build-up material in a hydrogen environment; nitriding the reduced material to produce a nitrided material and subsequently quenching the nitrided material to a martensitic transformation temperature; stress annealing the nitrided material; and magnetic field annealing the nitrided material.

DETAILED DESCRIPTION

Figure 1:
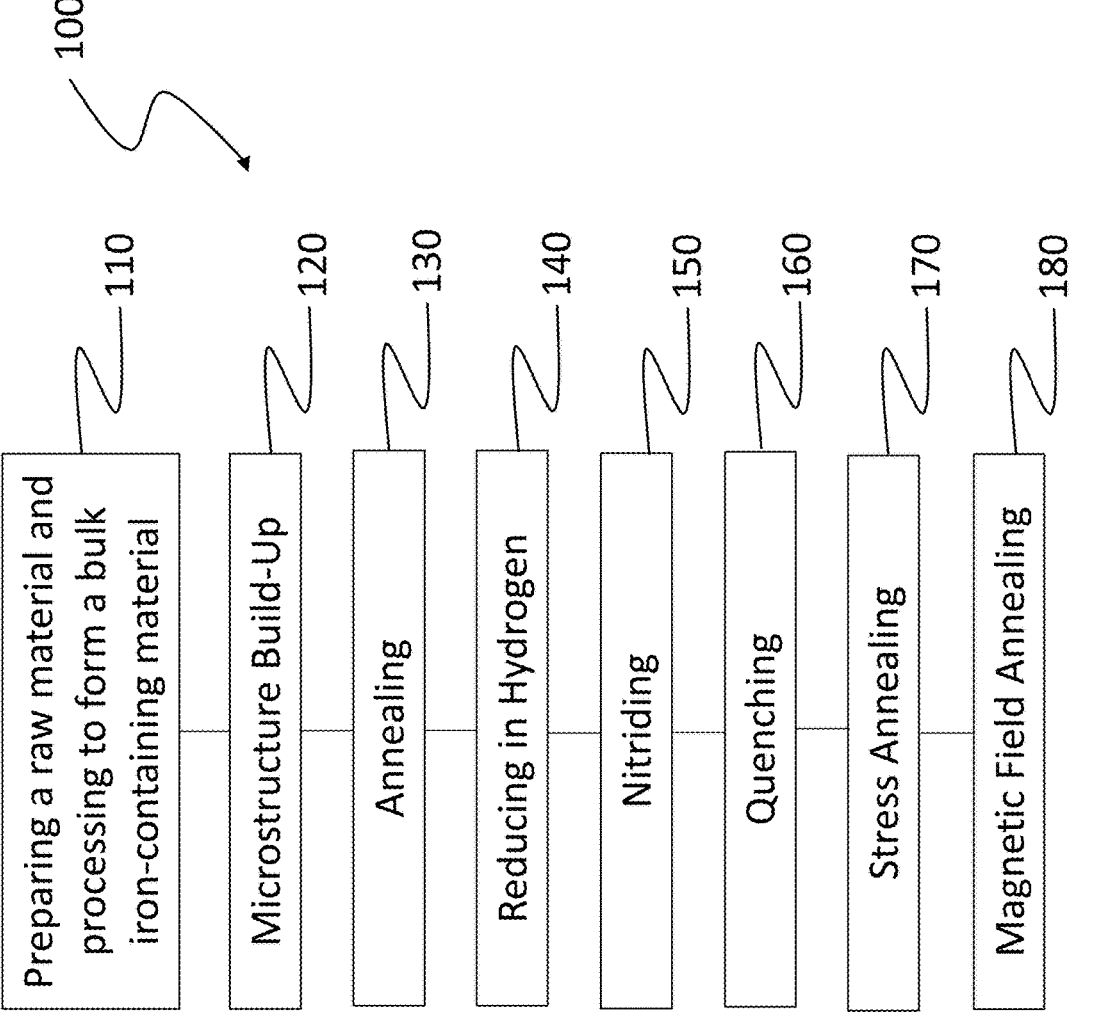
FIG. 1 describes an exemplary method 100 according to the disclosure.

The disclosure describes permanent magnets that include $Fe_{16}N_2$ phase and techniques for forming permanent magnets that include a $Fe_{16}N_2$ phase. The techniques described herein are used to form bulk permanent magnets that include $Fe_{16}N_2$ phase. In some examples, some crystallographic grains may include a $Fe_{16}N_2$ phase. In other examples, the $Fe_{16}N_2$ phase may be present in combination of other phases, such as phases of magnetically soft material. Through this disclosure, the terms $Fe_{16}N_2$, $\alpha''$-$Fe_{16}N_2$, $\alpha''$-$Fe_{16}N_2$ phase, $\alpha''$-$Fe_{16}N_2$ phase domain, for example, may be used interchangeably to refer to an $\alpha''$-$Fe_{16}N_2$ phase within a material.

Magnets that include a $Fe_{16}N_2$ phase may provide a relatively high energy product, for example, as high as about 134 MGOe when the $Fe_{16}N_2$ permanent magnet is anisotropic. The energy product of a permanent magnet is proportional to the product of coercivity and remanent magnetization. For comparison, the energy product of $Nd_2Fe_{14}B$ permanent magnet may be as high as about 60 MGOe. A higher energy product can lead to increased efficiency of the permanent magnet when used in motors, generators, or the like. Additionally, permanent magnets that include a $Fe_{16}N_2$ phase may not include rare earth element, which may reduce an environmental impact of producing the magnets.

The present disclosure may be understood more readily by reference to the following detailed description taken in connection with the accompanying figures and examples, which form a part of this disclosure. It is to be understood that this disclosure is not limited to the specific devices, methods, applications, conditions, or parameters described and/or shown herein, and that the terminology used herein is for the purpose of describing particular examples and is not intended to be limiting of the claims. When a range of values is expressed, another example includes from the one particular value and/or to the other particular value. Similarly, when values are expressed as approximations, by use of the antecedent "about," it will be understood that the particular value forms another example. All ranges are inclusive and combinable. Further, a reference to values stated in a range includes each and every value within that range.

It is to be appreciated that certain features of the disclosure which are, for clarity, described herein in the context of separate examples, may also be provided in combination in a single example. Conversely, various features of the disclosure that are, for brevity, described in the context of a single example, may also be provided separately or in any subcombination.

The disclosure describes exemplary materials including a plurality of grains. The disclosure also describes exemplary techniques for preparing the exemplary materials. In general, the disclosure describes iron-nitride materials having a polycrystalline microstructure including a plurality of elongated crystallographic grains with grain boundaries. The disclosure also describes exemplary techniques for producing the iron-nitride materials.

Materials according to the disclosure have a polycrystalline microstructure including a plurality of grains. The term "grains" refers to discrete microstructural domains defined by boundaries, for example, grains defined by grain boundaries where each grain is seen to be separated by its neighbors by dark lines (grain boundaries) in a micrograph of an etched sample. Grain boundaries include interface boundaries between single-phase grains and interphase boundaries between grains having different phases.

Grain boundaries define the respective shapes and respective dimensions of respective grains. For example, grain boundaries may define substantially spherical, ellipsoidal, cuboidal, polygonal, or any other shapes of grains. The shape of grains may define respective major dimensions of grains. For substantially spherical grains, the major dimension may be defined by a diameter. For substantially ellipsoidal grains, the major dimension may be defined by a major elliptical axis. For a grain that is symmetric or exhibits symmetry about an axis, a grain size of the grain may refer to the major dimension of the grain.

A grain boundary angle among grains with the same phase is, in general, determined by a crystallographic misorientation between two adjacent grains across the grain boundary. It is convenient to divide grain boundaries into those whose misorientation is greater than a certain angle, high angle grain boundaries (HAGB), and those whose misorientation is less than the certain angle, low angle grain boundaries (LAGB). The angle at which the transition from low to high angle boundaries occurs is typically taken as between 10° and 15°. A crystallographic grain may include substructures called sub-grains within the grain. Sub-grain boundaries among the sub-grains have, in general, a misorientation angle of less than about 10°-15° whereas most of grain boundaries have a high misorientation angle of about 10°-15° or higher.

The term "grains" may also refer to particles or crystallites to include compositional phases thereof. According to the disclosure, a plurality of grains in an iron-nitride material include grains having an iron-containing phase. One or more grains including the iron-containing phase include iron and nitrogen. One or more grains including the iron and nitrogen have an elongated grain morphology. One or more grains of the elongated grains have a grain aspect ratio of 2 or larger. For example, at least one of the elongated grains has a width in the range of from about 100 nm to about 500 nm and a length in the range of from about 1 to about 5 μm.

The magnetic interaction between adjacent ferromagnetic grains may reduce the coercive field of the magnet. It is important to control the grain size and the grain boundary composition to obtain the maximum coercive field, hence maximum energy product. The size of ferromagnetic grains can be controlled by thermo-mechanical processing of the iron-containing materials. Controlling the grain boundary composition can also be considered to obtain a high energy product magnet. The size of ferromagnetic grains can be controlled by using a doping element that controls the grain growth by precipitating along the grain boundaries. The grains of ferromagnetic FeN can be decoupled using a non-magnetic grain boundary composition. Non-magnetic precipitation can be utilized to decouple the ferromagnetic grains.

The disclosure describes multiple processes for forming bulk permanent magnets that include $Fe_{16}N_2$ phases. FIG. 1 describes an exemplary method 100 for preparing an iron-nitride material having a polycrystalline microstructure including a plurality of elongated crystallographic grains with grain boundaries. The method 100 includes preparing a raw material 110, carrying out microstructure build-up 120, and nitriding 150. In some examples, the method 100 may include at least some combinations of preparing a raw material 110, carrying out microstructure build-up 120, annealing 130, reducing in hydrogen 140, nitriding 150, quenching 160, stress annealing 170, and magnetic field annealing 180.

In preparing a raw material 110, the raw material includes iron. In some examples, the raw material may include any of B and Cu. Boron (B) is a doping element to control the microstructure and crystal structure of magnets. Copper (Cu) is another element used because of its insoluble nature in Fe. Cu is lowly soluble in α-Fe below 600° C., which makes Cu a great choice for phase segregation. Cu atoms cluster to form precipitate along the grain boundary and help in grain boundary engineering in decoupling of ferromagnetic FeN grains by non-magnetic Cu precipitates along the grain boundary and hindering the grain growth using Cu precipitates along the grain boundaries. In some examples, those grain boundaries may include unique combinations of voids, imperfections and non-magnetic materials. The raw material may further include at least one of Cu, B and Al. In other examples, the raw material may include a composition of $Fe_xCu_yB_zAl_w$, where: y is in the range of from 1 wt % to 8 wt %, z is in the range of from about 0.01 wt % to about 3 wt %, Al is in the range of from about 0.1 wt % to about 10 wt %, and x is a remainder of the composition.

Figure 2:
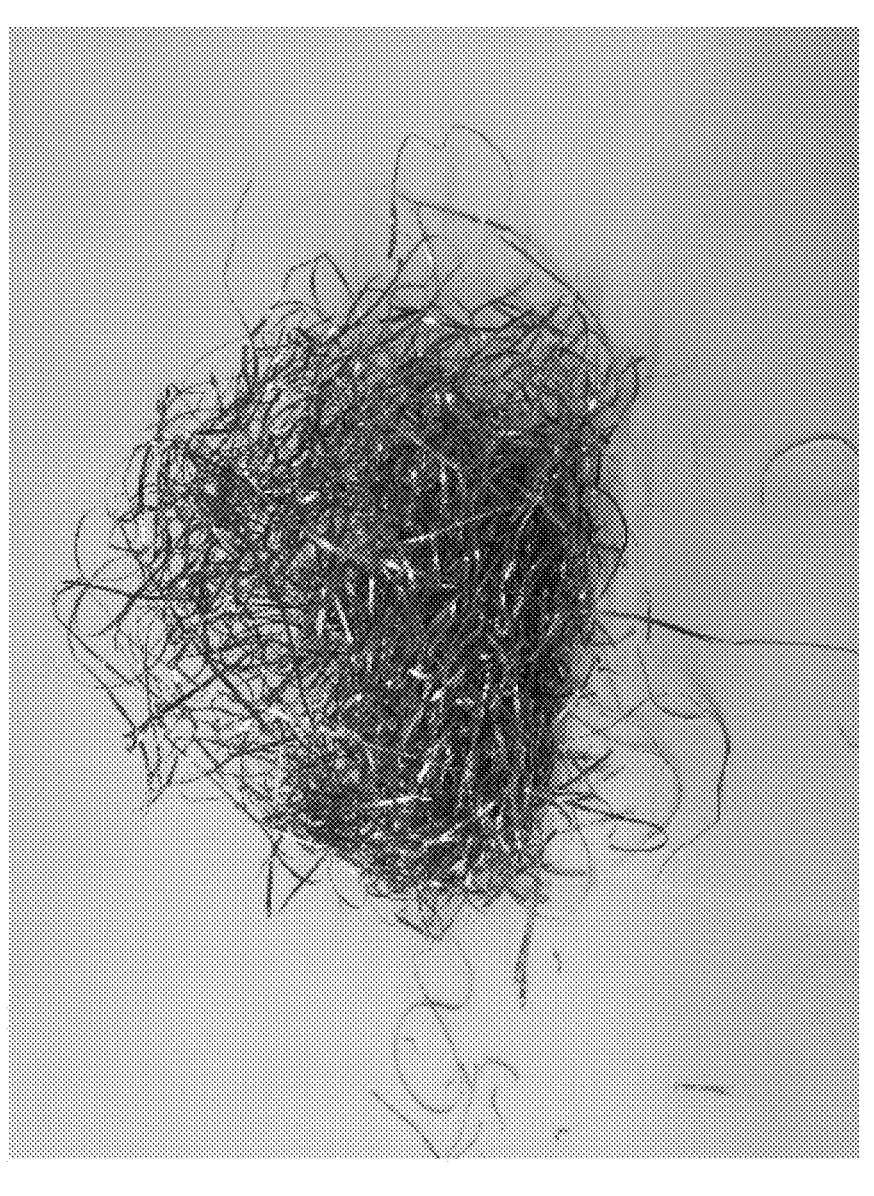
FIG. 2 shows ribbons prepared with an iron ingot by a melt spinner.
Figure 2:

The raw material is processed to form a bulk iron-containing material having a polycrystalline structure. In some examples, the raw material may be processed to form a bulk iron-containing material having a polycrystalline structure in a form of any of strip, ribbon, foil, sheet or plate 110. The material may be processed by various methods. In some examples, an iron-containing ribbon may be prepared with fast belt casting. For example, an iron-containing ribbon may be prepared with a melt spinning technique. FIG. 2 shows iron-containing ribbons prepared by a melt spinner. In melting spinning, an iron precursor or iron-containing raw material may be melted, e.g., by heating the iron-containing raw material in a furnace to form a molten iron-containing material. The molten iron-containing material then may be flowed over a cold roller surface to cool the molten iron-containing material and form a bulk iron-containing material in a form of ribbon as a polycrystalline microstructure including a plurality of grains forms during the quenching and rolling on the cold roller surface. In some examples, the cold roller surface may be cooled at a temperature between about 10° C. and about 25° C.

During the processing 110, the polycrystalline microstructure forms and a stored energy may be accumulated in the material by several ways. The grains change their shape and there is a large increase in the total grain boundary area. The grain boundary area is created during the processing 110 and this is done by the incorporation of some of the dislocations that are continuously created during the processing 110.

The prepared bulk iron-containing material having a polycrystalline structure is processed with the microstructure build-up 120. During the microstructure build-up 120, the bulk iron-containing material is heat-treated at an elevated temperature and subsequently quenched. The heat treatment may be carried out at a temperature about 450° C. or higher. In some examples, the heat treatment may be carried out at a temperature in the range of from about 450° C. to about 1150° C. In some examples, the heat treatment may be carried out at a temperature in the range of from about 550° C. to about 1100° C. In other examples, the heat treatment may be carried out at a temperature in the range of from about 700° C. to about 930° C. In some examples, the heat treatment may be carried out for a period of time between about 1 minute and about 1 hour. After heat-treating the material, the heat-treated material is quenched. In some examples, the bulk iron-containing material may be rolled and/or polished prior to or after the quenching. The quenching is a fast cooling step. In some examples, a cooling rate during the quenching may be about 1000K/sec. or faster. In other examples, a cooling rate during the quenching may be about 5000K/sec. or faster. Without wishing to be bound by theory, annealing may promote grain growth, and modify grain boundaries. Quenching may promote the formation of grains on rapid cooling of heated or molten material.

After the quenching in the microstructure build-up 120, the quenched material may be further annealed between about 400° C. and about 600° C. 130. Without wishing to be bound by theory, the additional annealing may promote a further change in the grain morphology.

In one embodiment, the bulk iron-containing material may be exposed to reducing species 140. For example, a reducing in hydrogen step 140 may be applied prior to nitriding the bulk iron-containing material 150. Without wishing to be bound by theory, reduction may help to remove any oxide phase in the surface of the material.

Nitriding the bulk iron-containing material 150 produces an iron-nitride material with desired phases. The nitriding 150 may proceed by contacting a nitrogen source with the bulk iron-containing material. Nitrogen from the nitrogen source is combined with iron to form iron nitride. In some examples, nitriding the bulk iron-containing material 150 may include heating the material including iron to a temperature for a time sufficient to allow diffusion of nitrogen to a predetermined concentration substantially throughout the volume of the annealed material. For example, the nitriding 150 may be carried out at a temperature between about 200° C. and about 550° C. in a $NH_3/H_2$ gas mixture. In another example, the nitriding 150 may be carried out at a temperature between about 400° C. and about 1100° C. in a $NH_3/H_2$ and/or $N_2/H_2$ gas mixture following with quenching. In other examples, the nitriding may be carried out at a temperature in a range of from 550° C. to 850° C. In another example, the nitriding 150 may be carried out at a temperature between about 450° C. and about 550° C. The nitriding may include heating the material for between about 1 hour and about 36 hours. In some examples, the nitriding may include heating the material for between 4 hours and about 36 hours.

During the nitriding 150, resulting phase constitutions may include iron-nitride phases such as $\alpha'-Fe_8N$, $\alpha''-Fe_{16}N_2$, and a body centered tetragonal (bct) phase including Fe and N. The $\alpha'-Fe_8N$ is the chemically disordered counterpart of chemically-ordered $\alpha''-Fe_{16}N_2$ phase. The $\alpha''-Fe_{16}N_2$ phase may have a body centered tetragonal (bct) crystal structure, and can introduce a relatively high magnetocrystalline anisotropy.

As the nitriding 150 is being completed, the nitrided material is quenched 160. During the quenching 160, a temperature of the material may be dropped abruptly below a martensite temperature of the material to produce a martensite structure. Martensitic phase transformation is another aspect of obtaining improved functional properties of iron nitrides. Martensitic phase transformation of a material is controlled by the following equation—

$$\Delta G^{\gamma-\alpha} = \Delta H^{\gamma-\alpha} \left[ \frac{T_0 - M_s}{T_0} \right] \qquad \text{(Equation 1)}$$

$\Delta G^{\gamma-\alpha}$ is the change in Gibbs free energy for martensitic phase transformation, $\Delta H^{\gamma-\alpha}$ is the change in enthalpy due to martensitic phase transformation, $M_S$, is the martensite start temperature and $T_0$ is the operating temperature. $\Delta G$ is controlled by undercooling of the material, $$\left[ \frac{T_0 - M_s}{T_0} \right].$$

The value of $M_s$ changes with different alloying condition.

In some examples, the nitride material may be quenched to a temperature about 150° C. or below. In some examples, the nitride material may be quenched to a temperature about 50° C. or below. In other examples, the nitride material may be quenched to about 0° C. or below. A cooling rate during the quenching may be about 1000K/sec. or faster. In other examples, a cooling rate during the quenching may be about 5000K/sec. or faster.

After the nitriding 150 and/or quenching 160, stress annealing 170 may be applied to the nitrided material at a temperature in the range of from about 140° C. to about 200° C. In some examples, stress annealing 170 may be applied to the nitrided material at a temperature in the range of from about 150° C. to about 180° C. During the stress annealing 170, the iron-nitride material may be annealed under an exerted force. In an unstrained iron body centered cubic (bcc) crystal lattice, the <100>, <010>, and <001> axes of the crystal unit cell may have substantially equal lengths. However, when a force, e.g., a tensile force, a compressive force or both, is applied to the crystal unit cell in a direction substantially parallel to one of the crystal axes, e.g., the <001> crystal axis, the unit cell may distort and the iron crystal structure may be referred to as a body centered tetragonal and/or distorted (bct) lattice. The iron unit cell may be referred to as a bct unit cell in the strained state. When the iron unit cell is in the strained state, the <001> axis may be referred to as the c-axis of the unit cell. A region containing grains having a bct phase may be referred to as a Body Centered Distorted (BCT) region in the microstructure. The nitriding 150 may continue for a predetermined time that is sufficient to allow diffusion of the nitrogen atoms to the appropriate interstitial spaces in the iron crystal lattice. Such diffusion may promote the formation of iron nitride phases, and may promote the conversion of disordered iron nitride phases, for example, $Fe_8N$, into ordered iron nitride phases, for example, $Fe_{16}N_2$. In some examples, the stress annealing 170 may occur under an inert atmosphere, such as Ar. In some examples, the BCT region may include any of Ga, Al, P, N, B, O and C.

In one embodiment, the iron-nitride material may be annealed under a magnetic field 180. Annealing iron nitride materials in the presence of an applied magnetic field may enhance the $Fe_{16}N_2$ phase domain formation in iron nitride materials. Improved magnetic properties may include, for example, coercivity, magnetization, and magnetic orientation. The applied magnetic field may be in the range of from about 5T to about 18T. In some examples, the applied magnetic field may be in the range of from about 10T to about 18T. The magnetic annealing may be carried out in the temperature range of from about 140° C. to about 200° C. In some examples, the magnetic annealing may be carried out in the temperature range of from about 160° C. to about 180° C.

Without wishing to be bound by theory, a magnetic field may align or substantially align the iron-nitride crystals and/or grains with a magnetic field direction. In some examples, the magnetic field direction may be substantially parallel to a sample orientation. In a certain aspect, the magnetic field direction may be substantially parallel to a longitudinal direction of the sample. In another example, the magnetic field direction may be substantially parallel to the longitudinal grain axis of elongated grains.

A magnetic easy axis is the direction of a crystal cell along which alignment of the magnetic moment is energetically favorable and metastable. In some examples, the magnetic easy axis of a unit cell of an iron-based phase domain including uniaxial magnetic anisotropy is the <001> or c-axis. By applying a magnetic field during annealing, magnetic easy axes of at least one or more grains including at least one iron-based phase domain may be aligned parallel or substantially parallel to the direction of the applied magnetic field. In some examples, a magnetic easy axis of an $\alpha''$-$Fe_{16}N_2$ phase domain may be aligned parallel or substantially parallel to the direction of the applied magnetic field. In a certain aspect, the magnetic easy axes may be parallel to the direction of the applied magnetic field within 15 degrees or less. In another aspect, the magnetic easy axes may be parallel to the direction of the applied magnetic field within 5 degrees or less.

Iron-nitride grains may be influenced such that growth of the grains having a predetermined orientation may be energetically favorable. For example, iron-nitride grains having (002) or (004) crystal planes substantially parallel to the direction of an applied magnetic field may be more energetically favorable than iron-nitride grains with a different orientation (e.g., with a (110), (112), (202), or (200) crystal plane). Thus, the applied field may increase the likelihood that some or all iron-nitride grains may have a similar crystal orientation. A material with multiple iron-nitride crystals with a substantially similar crystal orientation or a preferred crystal orientation may increase magnetic anisotropy of the material.

According to the disclosure, iron-nitride materials have a polycrystalline microstructure including a plurality of elongated crystallographic grains with grain boundaries. In some example, an iron-nitride material may include a polycrystalline microstructure including a plurality of elongated crystallographic grains with grain boundaries one or more of which form at least in part planar grain boundaries.

Grain boundaries define the respective shapes and respective dimensions of respective grains. For example, grain boundaries may define substantially spherical, ellipsoidal, cuboidal, polygonal, or any other closed shapes of grains. In some examples, grain boundaries may be substantially thin or narrow, for example, relative to the average grain size. The shape of grains may define respective major dimensions of grains. For substantially spherical grains, the major dimension may be defined by a diameter. For substantially ellipsoidal grains, the major dimension may be defined by a major elliptical axis. For a grain that is symmetric or exhibits symmetry about an axis, a grain size of the grain may refer to the major dimension of the grain.

The most common shape factor is the aspect ratio, a function of the largest diameter and the smallest diameter orthogonal to it:

$$A_R = \frac{D_{max}}{D_{min}} \qquad \text{(Equation 2)}$$

The $A_R$ may vary from one for an equiaxed grain to approaching infinity for a very elongated grain. According to the disclosure, one or more elongated grains may have a grain aspect ratio of 1.5 or larger. In some examples, one or more elongated grains may have a grain aspect ratio of 2 or larger.

In some examples, an iron-nitride material may include an iron-nitride phase having any of a body centered cubic (bcc) structure, a body centered tetragol (bct) structure and a martensite structure. In some examples, an iron-nitride material may include one or more of the elongated crystallographic grains including an iron-nitride phase having any of a body centered cubic (bcc) structure, a body centered tetragonal (bct) structure and a martensite structure. In some examples, an iron-nitride material may include one or more of the elongated crystallographic grains including $Fe_{16}N_2$ having any of a body centered tetragonal (bct) structure and a martensite structure. In other examples, the iron-nitride material may further include an antiferromagnetic phase. The antiferromagnetic phase may include $Fe_xA_y$, where A is N, B, O or a combination thereof and a ratio of x:y is in the range of from about 2:3 to about 3:1.

An iron-nitride material according to the disclosure has a coercivity of 3 kOe or higher at room temperature. In some examples, the iron-nitride material may have a coercivity of 5 kOe or higher at room temperature. In some examples, the iron-nitride material may have a coercivity of 8 kOe or higher at room temperature. In some examples, the iron-nitride material may have a coercivity of 10 kOe or higher at room temperature. In some examples, the iron-nitride material may have a coercivity of 20 kOe or higher at room temperature. In some examples, the iron-nitride material may have a coercivity of 30 kOe or higher at room temperature.

INDUSTRIAL APPLICABILITY

The disclosure may be applicable to iron-containing materials to produce iron rich permanent magnets. The raw material includes iron. In some examples, the raw material may include any of B and Cu. In another example, the raw material may include a composition of $Fe_xCu_yB_zAl_w$, where: y is in the range of from 1 wt % to 8 wt %, z is in the range of from about 0.01 wt % to about 3 wt %, Al is in the range of from about 0.1 wt % to about 10 wt %, and x is a remainder of the composition.

The raw material is further processed to form a bulk material. The raw material may be processed by various methods to form the bulk shape. For example, the raw material may be further processed to form a strip, a ribbon, a foil, a sheet, or a plate 110. In one example, an iron-containing ribbon may be prepared with a melt spinning technique. In melting spinning, an iron precursor or iron-containing raw material may be melted, e.g., by heating the iron-containing raw material in a furnace to form a molten iron-containing material. The molten iron-containing material then may be flowed over a cold roller surface to quench the molten iron-containing material and form a ribbon of material. Crystallographic texture may be introduced to the iron crystals as they form during cooling on the cold roller surface. A thickness of the bulk iron-containing material may be adjusted. In some examples, the thickness may be 0.1 µm or larger. In another example, the thickness may be in a range of 0.1 µm and 1 mm. In another example, the thickness may be about 200 µm or less. In other examples, the thickness may be about 100 µm or less.

In some examples, long and wide ribbons of iron-containing material may be obtained through planar flow melt spinning (PFMS) process. The process involves induction melting of iron-containing material in a crucible followed by ejection through a nozzle onto a rotating wheel. Once the material melts, the crucible is brought down close to the rotating wheel and the melt is ejected using a positive pressure of inert gas to form the long and wide ribbons.

In another example, an iron-containing strip and/or ribbon may be prepared with continuous casting. A molten iron mixture flows out of ingot chamber through a nozzle to form an iron-containing strip. The iron-containing strip is fed into a gap zone between rollers, which are rotated in opposite directions. In some examples, the rotation speed of the rollers may vary, and the rollers with respect to each other may rotate at the same rate. In some examples, the rollers are actively cooled with a cooling medium, e.g., using water cooling, which maintains the surfaces of rollers at a temperature below the temperature of the iron-containing strip and aids in cooling and casting iron-nitride strip.

The bulk iron-containing material having a polycrystalline structure is processed with the microstructure build-up 120. During the microstructure build-up 120, the bulk iron-containing material is heat-treated and subsequently quenched. In some examples, the heat treatment may be carried out at an atmospheric pressure. In some examples, the heat treatment may be performed in a nitrogen or argon atmosphere. After heat-treating the material, the heat-treated material may be quenched to oil or water at room temperature. In some examples, rolling and/or polishing the bulk iron-containing material may be carried out prior to, during, or after the microstructure build-up 120.

During the reducing in hydrogen 140, the bulk iron-containing material may be exposed to $H_2$ at a temperature in the range of from about 200° C. to about 500° C. for up to about 10 hours. In some examples, the material may be exposed to $H_2$ at a temperature in the range of from about 300° C. to about 500° C. A flow rate of hydrogen source may be about 30 standard cubic centimeters per minute (sccm) or higher. In some examples, a flow rate of hydrogen source may be about 40 standard cubic centimeters per minute (sccm) or higher.

For the nitriding 150, in some examples, a nitrogen source may be provided from another nitrogen precursor, such as ammonia ($NH_3$), an amine, or ammonium nitrate ($NH_4NO_3$). In other examples, the nitrogen source may be provided from urea ($CO(NH_2)_2$). Nitrogen may be supplied in a gas phase alone (e.g., substantially pure ammonia or diatomic nitrogen gas) or as a mixture with a carrier gas. Nitrogen may diffuse into the bulk iron-containing material from the nitrogen gas or gas mixture including Ar and/or hydrogen carrier gas. In some examples, a volumetric ratio of ammonia and hydrogen may be in the range of from about 1:10 to 10:1 during the nitriding 150. In some examples, a volumetric ratio of ammonia and hydrogen may be in the range of from about 1:3 to 3:1 during the nitriding 150.

A medium used for quenching 160 may include a liquid, such as water, brine (with a salt concentration between about 1% and about 30%), a non-aqueous liquid or solution such as oil, or liquid nitrogen. In some examples, the quenching medium may include a gas, such as nitrogen gas with a flow rate between about 1 sccm and about 1000 sccm. In some examples, the quenching medium may include a solid, such as salt, sand, or the like. In other examples, a cooling rate during the quenching may be about 1000K/sec. or faster. In another example, a cooling rate during the quenching may be about 5000K/sec. or faster.

Stress annealing 170 may be carried out by straining and annealing the iron-nitride material. Straining the iron-nitride material may form a textured iron-nitride material. In some examples, straining may include applying a suitable tensile force to opposing ends of an iron-nitride material. In some examples, straining the iron-nitride material may include applying a compressive force to the iron-nitride material along at least one axis orthogonal to the axis of the applied tensile force. In some examples, straining the iron-nitride material may also include straining the iron-nitride material in a direction substantially parallel to respective <001> crystal axes of the plurality of iron-nitride crystals in the material.

In some examples, a strain inducing apparatus may strain a strip or ribbon to a certain elongation. For example, the strain on the strip or ribbon may be between about 0.1% and about 7%. In some examples, the strain on the strip or ribbon may be less than about 0.1% or greater than about 4%. In other examples, the strain on the strip or ribbon may be less than about 0.1% or greater than about 7%. In some examples, exerting a certain strain on the strip or ribbon may result in a substantially similar strain on individual unit cells of the iron, such that the unit cell is elongated along the <001> axis between about 0.1% and about 7%.

In certain embodiments, the nitrided material may be stress annealed 170 and/or magnetic field annealed 180 at a temperature for a time to facilitate diffusion of the nitrogen atoms into appropriate interstitial spaces within the iron lattice to form $\alpha''\text{-Fe}_{16}\text{N}_2$. In some examples, the annealing process may continue for between about 1 hour and about 100 hours, such as between about 40 hours and about 60 hours. In some examples, the annealing process may occur under an inert atmosphere, such as Ar, to reduce or substantially prevent oxidation of the iron.

The bulk iron-nitride material in accordance of the disclosure may be in any form. In some examples, the bulk iron-nitride material may in a form of any of strip, ribbon, foil, sheet, and plate. In some examples, the bulk iron-nitride material may be a single layer of strip, ribbon, foil, sheet, or plate. In other examples, the bulk iron-nitride material may be in a form of stack having a plurality of layers of ribbon, foil, sheet, or plate. One or more dimensions of the bulk iron-nitride material may be about 1 μm or more. In some examples, one or more dimensions may be about 10 μm or more. In other examples, one or more dimensions may be about 0.1 mm or more. In other examples, one or more dimensions may be about 1 mm or more. In some examples, at least three orthogonal dimensions each of which is parallel with one of three orthogonal sample axes may be about 1 μm or more. In some examples, at least three orthogonal dimensions each of which is parallel with one of three orthogonal sample axes may be about 10 μm or more. In some examples, at least three orthogonal dimensions each of which is parallel with one of three orthogonal sample axes may be about 0.1 mm or more. In some examples, at least three orthogonal dimensions each of which is parallel with one of three orthogonal sample axes may be about 1 mm or more.

Clause 1: A method for producing an iron-nitride material having a polycrystalline microstructure comprising a plurality of elongated crystallographic grains with grain boundaries, comprising: preparing a raw material comprising iron; carrying out a microstructure build-up by annealing the prepared raw material at an elevated temperature and subsequently quenching the prepared raw material to produce a microstructure build-up material; and nitriding the microstructure build-up material to produce a nitrided material and subsequently quenching the nitrided material to a martensitic transformation temperature.

Clause 2: The method according to Clause 1, wherein at least one of the elongated crystallographic grains has a grain aspect ratio of 1.5 or higher.

Clause 3: The method according to Clause 1, wherein at least one of the elongated crystallographic grains comprises a martensite structure.

Clause 4: The method according to Clause 3, wherein the quenching of the nitrided material produces the martensite structure.

Clause 5: The method according to Clause 1, wherein the elevated temperature in the microstructure build-up is 500° C. or higher.

Clause 6: The method according to Clause 1, wherein the elevated temperature in the microstructure build-up is in a range of from 450° C. to 1150° C.

Clause 7: The method according to Clause 1, wherein the nitriding is carried out at a temperature in a range of from 400° C. to 1100° C.

Clause 8: The method according to Clause 1, wherein the nitriding is carried out at a temperature in a range of from 450° C. to 550° C.

Clause 9: The method according to Clause 1, wherein the martensitic transformation temperature is 150° C. or lower.

Clause 10: The method according to Clause 1, wherein the preparing a raw material comprises forming any of strip, foil, ribbon, sheet and plate with the raw material.

Clause 11: The method according to Clause 1, wherein the preparing a raw material comprises melt-spinning the raw material to form a strip or ribbon of the raw material.

Clause 12: The method according to Clause 1, further comprising: annealing the microstructure build-up material prior to the nitriding.

Clause 13: The method according to Clause 12, wherein the annealing the microstructure build-up material is carried out at a temperature in a range of from 400° C. to 600° C.

Clause 14: The method according to Clause 1, further comprising: stress annealing the nitrided material.

Clause 15: The method according to Clause 14, wherein the stress annealing comprises applying tension, compression, or both, to the nitrided material with a strain in a range of 0.1% to 4%.

Clause 16: The method according to Clause 14, wherein the stress annealing is carried out at a temperature in the range of from about 140° C. to about 200° C. for a time in the range of from about 10 to about 100 hours.

Clause 17: The method according to Clause 1, further comprising: magnetic field annealing the nitrided material.

Clause 18: The method according to Clause 17, wherein the magnetic field annealing is carried out at a magnetic field in the range of from about 5 T to about 18 T.

Clause 19: The method according to Clause 17, wherein the magnetic field annealing is carried out at a temperature in the range of from about 140° C. to about 200° C.

Clause 20: The method according to Clause 17, wherein the nitriding uses a mixture of ammonia and hydrogen having a volumetric ratio in a range of from 1:10 to about 10:1.

Clause 21: The method according to Clause 14, further comprising: magnetic field annealing the stress-annealed material.

Clause 22: The method according to Clause 1, further comprising: reducing the microstructure build-up material in a hydrogen environment.

Clause 23: The method according to Clause 1, wherein the microstructure build-up comprises rolling a prepared raw material.

Clause 24: The method according to Clause 1, further comprising: polishing the microstructure build-up material.

Clause 25: The method according to Clause 1, wherein the quenching for the microstructure build-up is carried out at a cooling rate of 1000K/sec. or faster.

Clause 26: The method according to Clause 1, wherein the quenching for the microstructure build-up is carried out at a cooling rate of 5000K/sec. or faster.

Clause 27: The method according to Clause 1, wherein the quenching of the nitrided material is carried out at a cooling rate of 1000K/sec. or faster.

Clause 28: The method according to Clause 1, wherein the quenching of the nitrided material is carried out at a cooling rate of 5000K/sec. or faster.

Clause 29: The method according to Clause 1, wherein the raw material further comprises as least one of Cu and B.

Clause 30: The method according to Clause 1, wherein the raw material comprises a composition of $Fe_xCu_yB_zAl_w$, wherein: y is in the range of from 1 wt % to 8 wt %, z is in the range of from about 0.01 wt % to about 3 wt %, Al is in the range of from about 0.1 wt % to about 10 wt %, and x is a remainder of the composition.

Clause 31: The method according to Clause 30, wherein the microstructure build-up comprises segregating Cu atoms along the grain boundaries.

Clause 32: The method according to Clause 30, wherein the nitriding comprises segregating B atoms.

Clause 33: The method according to Clause 1, wherein at least one of the elongated crystallographic grains has a width in a range of from 100 nm to 500 nm and a length in a range of from 1 μm to 5 μm.

Clause 34: The method according to Clause 1, wherein at least one of the elongated crystallographic grains comprises at least one of an $\alpha''\text{-}Fe_{16}N_2$ phase and a body-center-tetragonal (bct) phase comprising Fe and N.

Clause 35: A method according to Clause 1, comprising: preparing a raw material comprising iron; carrying out a microstructure build-up by annealing the prepared raw material at an elevated temperature and subsequently quenching the prepared raw material to produce a microstructure build-up material; annealing the microstructure build-up material; reducing the microstructure build-up material in a hydrogen environment; nitriding the reduced material to produce a nitrided material and subsequently quenching the nitrided material to a martensitic transformation temperature; stress annealing the nitrided material; and magnetic field annealing the stress-annealed material.

Clause 36: A permanent magnet comprising the iron-nitride material obtained by the method according to Clause 1.

Clause 37: An iron-nitride material having a polycrystalline microstructure including a plurality of elongated crystallographic grains with grain boundaries, comprising at least one of an $\alpha''\text{-}Fe_{16}N_2$ phase and a body-center-tetragonal (bct) phase comprising Fe and N.

Clause 38: The iron-nitride material according to Clause 37, wherein at least one of the elongated crystallographic grains has a grain aspect ratio of 1.5 or larger.

Clause 39: The iron-nitride material according to Clause 37, wherein at least one of the elongated crystallographic grains has a width in a range of from about 100 nm to about 500 nm and a length in a range of from about 1 μm to about 5 μm.

Clause 40: The iron-nitride material according to Clause 37, wherein at least one of the elongated crystallographic grains comprises a martensite structure.

Clause 41: The iron-nitride material according to Clause 40, wherein the martensite structure comprises any of an $\alpha''\text{-}Fe_{16}N_2$ phase and a body-center-tetragonal (bct) phase comprising Fe and N.

Clause 42: The iron-nitride material according to Clause 37, further comprising as least one of Cu, and B.

Clause 43: The iron-nitride material according to Clause 42, further comprising a composition of $Fe_xCu_yB_zAl_w$, wherein: y is in the range of from 1 wt % to 8 wt %, z is in the range of from about 0.01 wt % to about 3 wt %, Al is in the range of from 0.1 wt % to 10 wt %, and x is a remainder of the composition.

Clause 44: The iron-nitride material according to Clause 37, further comprising an antiferromagnetic phase.

Clause 45: The iron-nitride material according to Clause 44, wherein the antiferromagnetic phase comprises $Fe_xA_y$, wherein A comprises N, B, O or a combination thereof, wherein a ratio of x:y is in a range of from about 2:3 to about 3:1.

Clause 46: The iron-nitride material according to Clause 37, further comprising: a body-centered-distorted (BCT) region comprising a plurality of the elongated crystallographic grains with grain boundaries, wherein the plurality of the elongated crystallographic grains comprises at least one of an $\alpha''\text{-}Fe_{16}N_2$ phase and a body-centered-tetragonal (bct) phase comprising Fe and N.

Clause 47: The iron-nitride material according to Clause 46, wherein the BCT region comprises at least one of Ga, Al, P, B, N, O and C.

Clause 48: The iron-nitride material according to Clause 46, wherein the BCT region is morphologically elongated so that one or more of the grain boundaries form at least in part planar grain boundaries.

Clause 49: The iron-nitride material according to Clause 48, wherein the iron-nitride material has a preferred crystallographic orientation with respect to a sample orientation parallel to at least one of the planar grain boundaries.

Clause 50: The iron-nitride material according to Clause 37, wherein the iron-nitride material is in a form of any of strip, foil, ribbon, sheet and plate.

Clause 51: The iron-nitride material according to Clause 37, wherein one or more dimensions of the iron-nitride material is 50 μm or more.

Clause 52: The iron-nitride material according to Clause 37, wherein one or more dimensions of the iron-nitride material is 0.1 mm or more.

The iron-nitride material according to Clause 37, wherein the material has a coercivity of 3 kOe or higher at room temperature.

The iron-nitride material according to Clause 37, wherein the material has a coercivity of 5 kOe or higher at room temperature.

The iron-nitride material according to Clause 37, wherein the material has a coercivity of 8 kOe or higher at room temperature.

The iron-nitride material according to Clause 37, wherein the material has a coercivity of 10 kOe or higher at room temperature.

The iron-nitride material according to Clause 37, wherein the material has a coercivity of 20 kOe or higher at room temperature.

The iron-nitride material according to Clause 37, wherein the material has a coercivity of 30 kOe or higher at room temperature.

EXAMPLES

Fe-ribbons doped with Cu and B were prepared 110 by a melt spinning system as shown in FIG. 2. The ribbons had a composition of $Fe_xCu_yB_zAl_w$, where: y is in the range of from 1 wt % to 8 wt %, z is in the range of from about 0.01 wt % to about 3 wt %, Al is in the range of from about 0.1 wt % to about 10 wt %, and x is a remainder of the composition. An average thickness of the ribbons was below 100 μm. The Fe ribbons were processed with the microstructure build-up by annealing at a temperature between 700° C. and 900° C. and subsequent quenching. Subsequently, the Fe ribbons were annealed at a temperature between 400° C. and 600° C. and then polished. The Fe ribbons were then reduced in hydrogen at 500° C. and nitrided at a temperature between 450° C. and 550° C. For the nitriding, the ribbons were place in a quartz tube with ammonia of 60 sccm and hydrogen of 40 sccm.

The post-nitriding processes, stress annealing and magnetic field annealing, were carried out. The stress annealing was carried out by using a C-type tensile fixture at a temperature between 150° C. and 180° C. The magnetic field annealing was carried out with a magnetic field in the range of 10T to 18 T at a temperature between 160° C. and 180° C.

The chemical composition of the sample was measured by Physical Electronics 670 Auger electron spectroscopy (AES). The depth profile of the ribbons was done by mounting the ribbons along the thickness direction and run auger electron beam through the thickness of the ribbon. The micro-diffractometer with Co Kα radiation (Bruker D8 Discover 2D) was used to obtain the x-ray diffraction (XRD) spectrum. The spectrum was then converted to Cu Kα standard diffraction pattern using a software, JADE. The Scanning Electron Microscope (SEM) and Transmission Electron Microscope (TEM) analyses were carried out respectfully.

Figure 3:
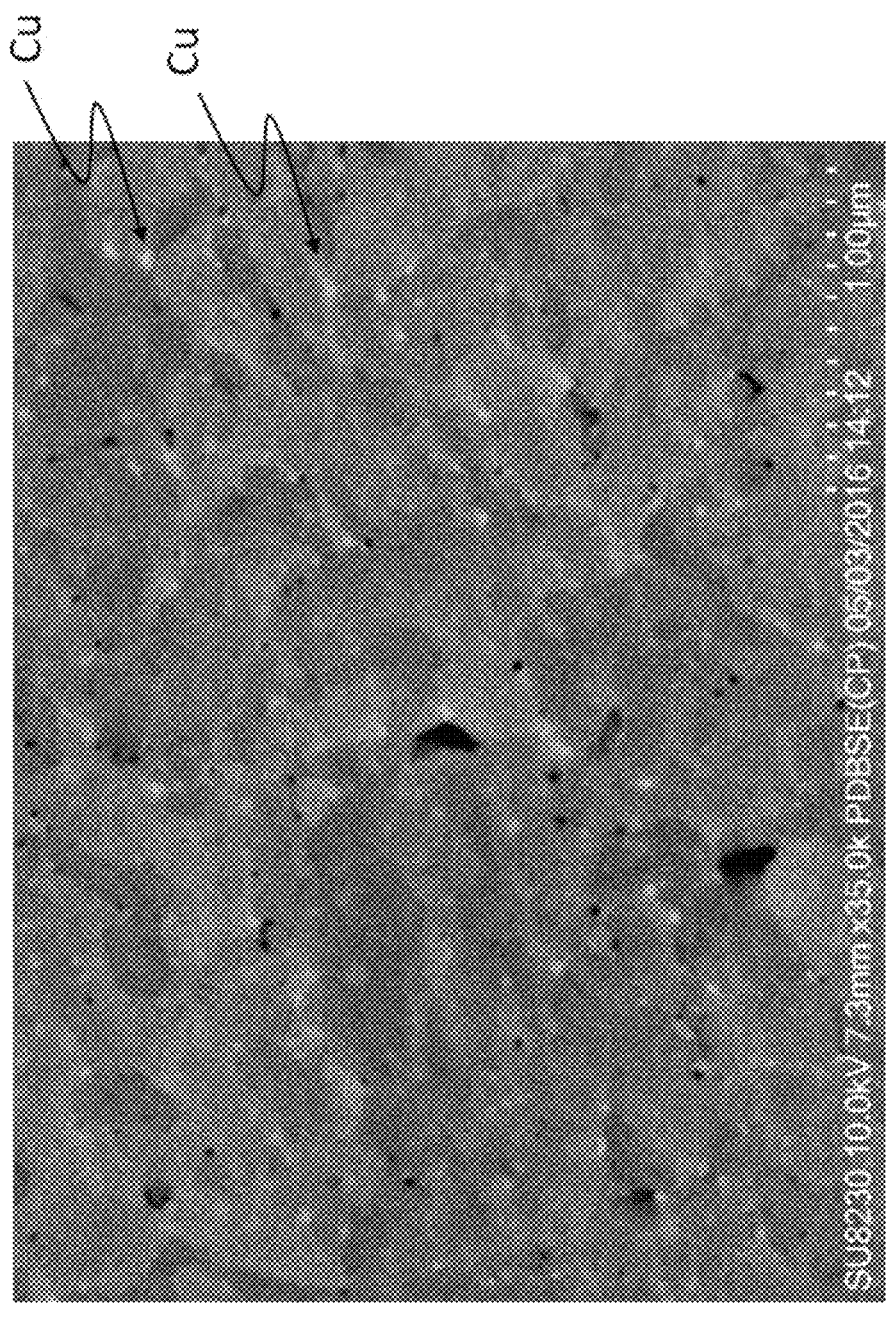
FIG. 3 shows a micrograph taken after the microstructural build-up step.

FIG. 3 shows a micrograph taken after the microstructural build-up step 120 where Cu atoms are segregated along grain boundaries.

Figure 4:
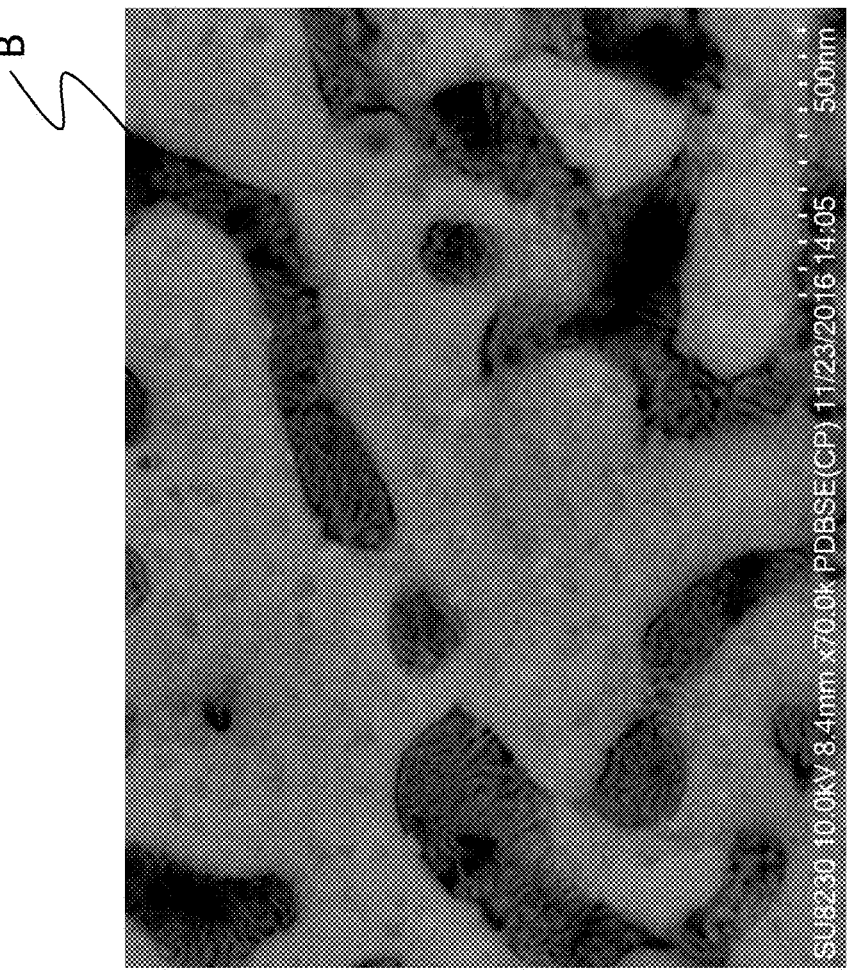
FIG. 4 shows a micrograph taken after the nitriding.

FIG. 4 shows another micrograph taken after the nitriding. Segregated boron atoms are shown dark within the grains whereas Cu atoms are located along grain boundaries.

Figure 5:
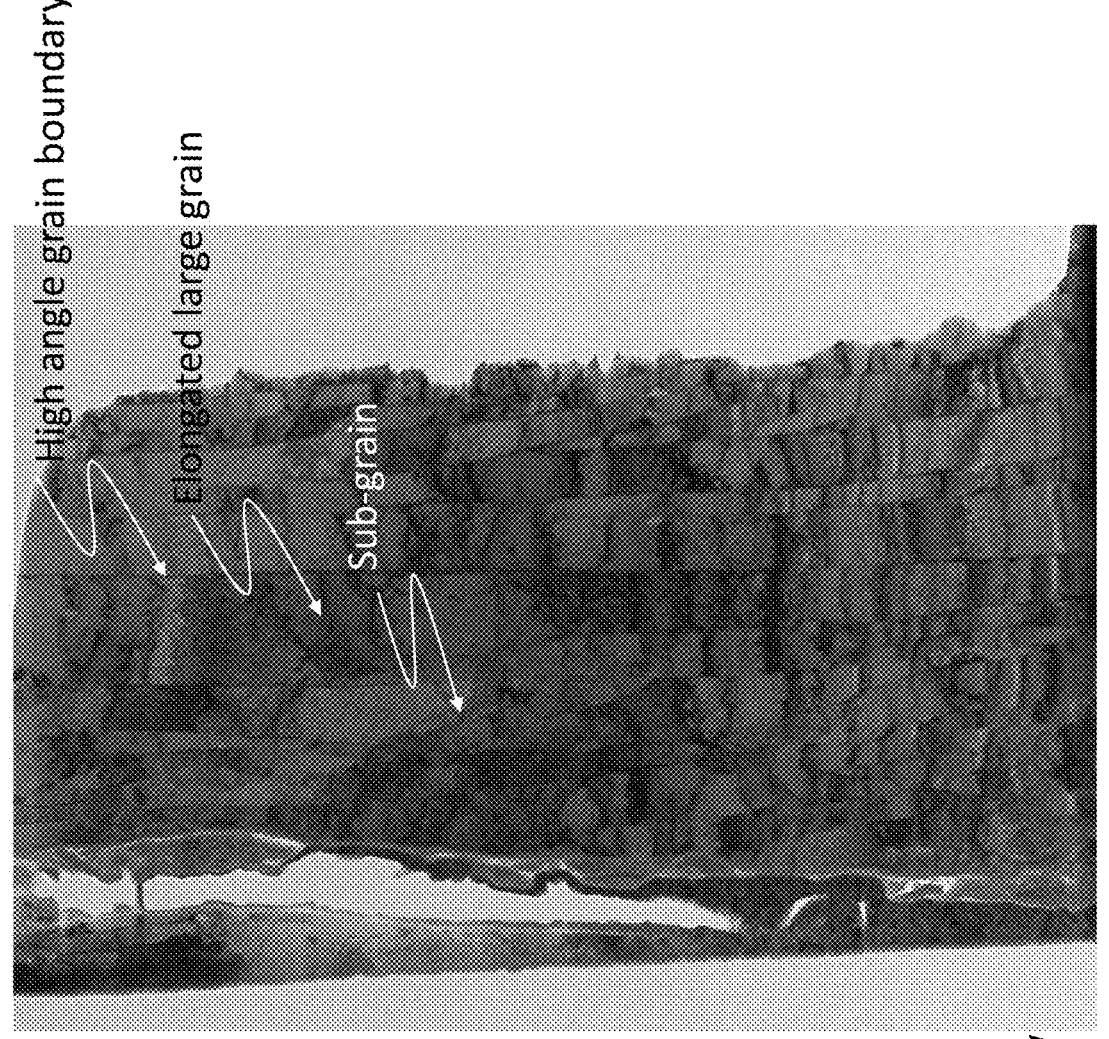
FIG. 5 shows a STEM (Scanning Transmission Electron Microscope) image after the stress annealing and subsequent magnetic field annealing.
Figure 5:

FIG. 5 shows a STEM (Scanning Transmission Electron Microscope) image after the stress annealing and subsequent magnetic field annealing. Grains are elongated and show a martensite morphology. A feature of the microstructure includes a plate morphology where grains have grown in a limited number of sample orientations. Many grains are elongated in plate-like shape or in lath shape along the longitudinal direction (L) of the sample with respect to the thickness (T) or width (W) direction. One or more of the elongated grains have at least in part planar grain boundaries along the longitudinal direction and have a length at least two times longer than a width of the grain.

Figure 6:
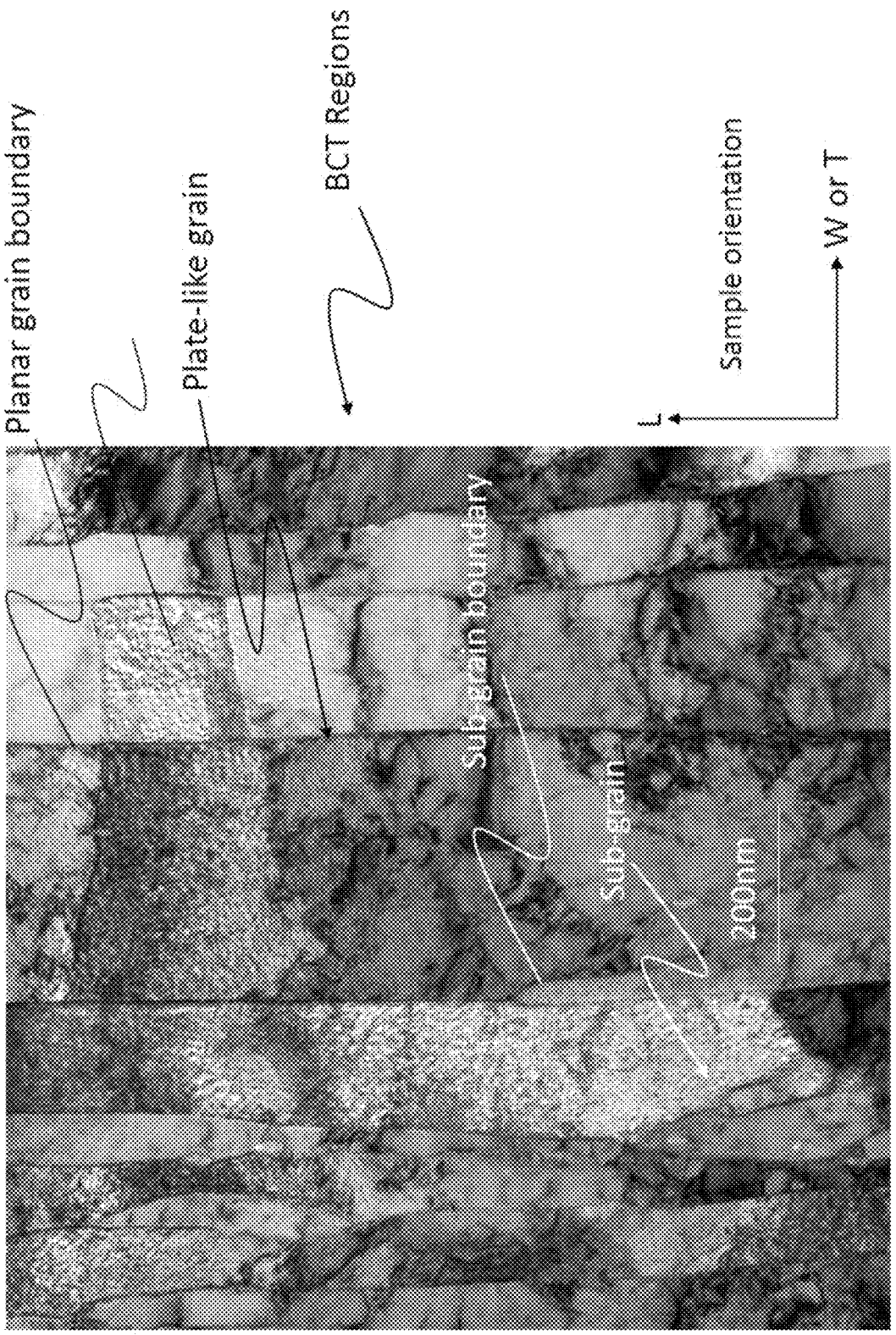
FIG. 6 shows a TEM image showing a BCT (body-centered distorted) region.

FIG. 6 shows a TEM image showing a BCT (body-centered distorted) region having a plurality of elongated grains containing $Fe_{16}N_2$ phases having any of a body center tetragonal structure and a martensite structure. Many of the elongated grains have a width in the range of from about 100 nm to about 500 nm and a length in the range of from about 1 to about 5 μm. Some of the elongated grains have substantially planar grain boundaries parallel to the longitudinal direction of the sample. Additionally, within an elongated grain between planar grain boundaries, various elliptical sub-grains form with sub-grain boundaries which are not necessarily parallel to the planar grain boundaries. At least one of the sub-grains has a grain size in the range of from about 20 nm to about 100 nm. Misorientations of the sub-grain boundaries are smaller than the misorientations of the planar grain boundaries. Many misorientations of the sub-grain boundaries are less than 10°.

Figure 7:
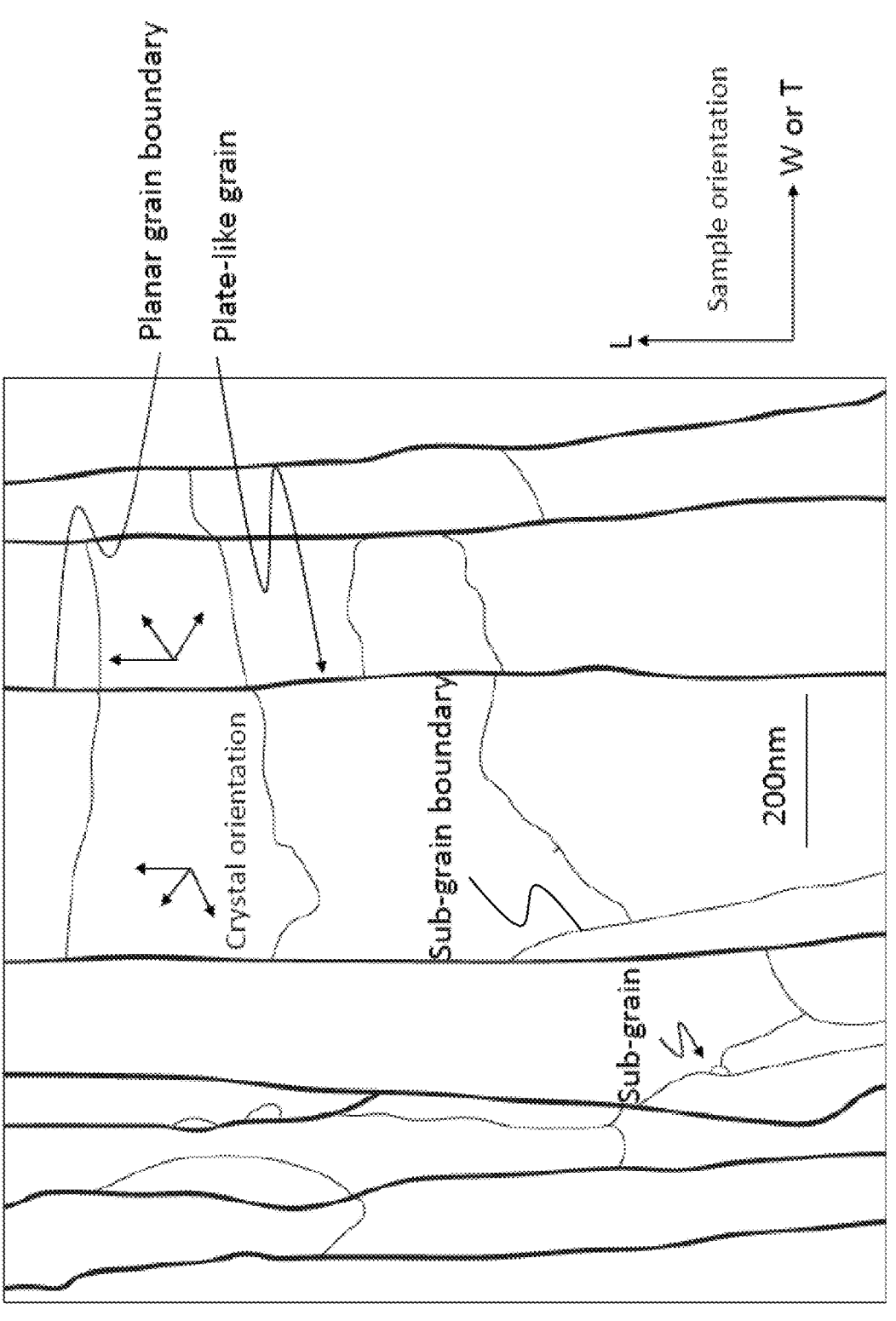
FIG. 7 is a schematic description of the TEM image of FIG. 6.

FIG. 7 is a schematic description of the TEM image of FIG. 6.

Figure 8:
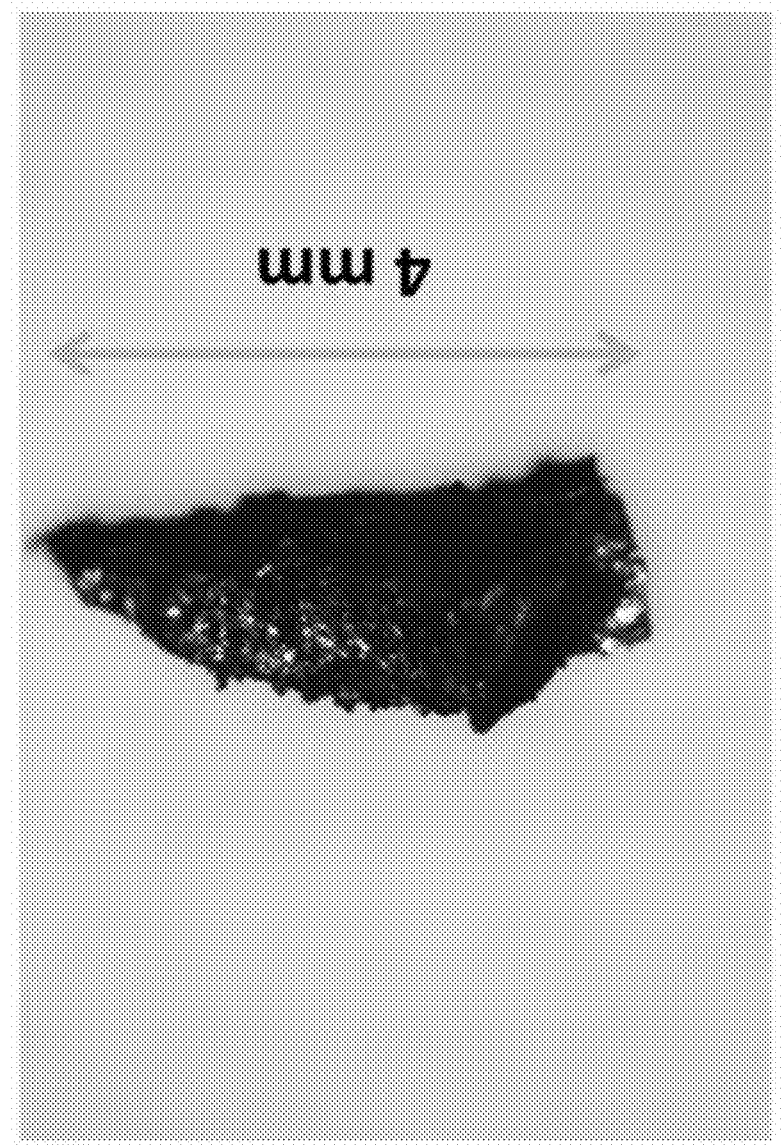
FIG. 8 shows an iron nitride material obtained after stress annealing.

FIG. 8 shows an iron nitride material obtained after stress annealing.

Figure 9:
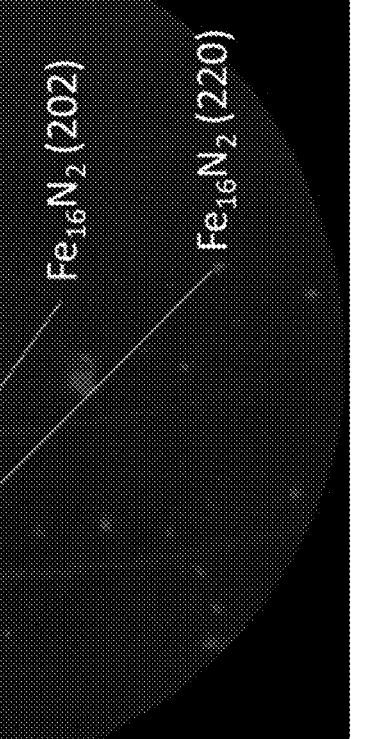
FIG. 9 shows a diffraction pattern of a textured iron nitride material.

FIG. 9 shows a diffraction pattern confirming a textured material. The coercivity showed about 6220 Oe.

Figure 10:
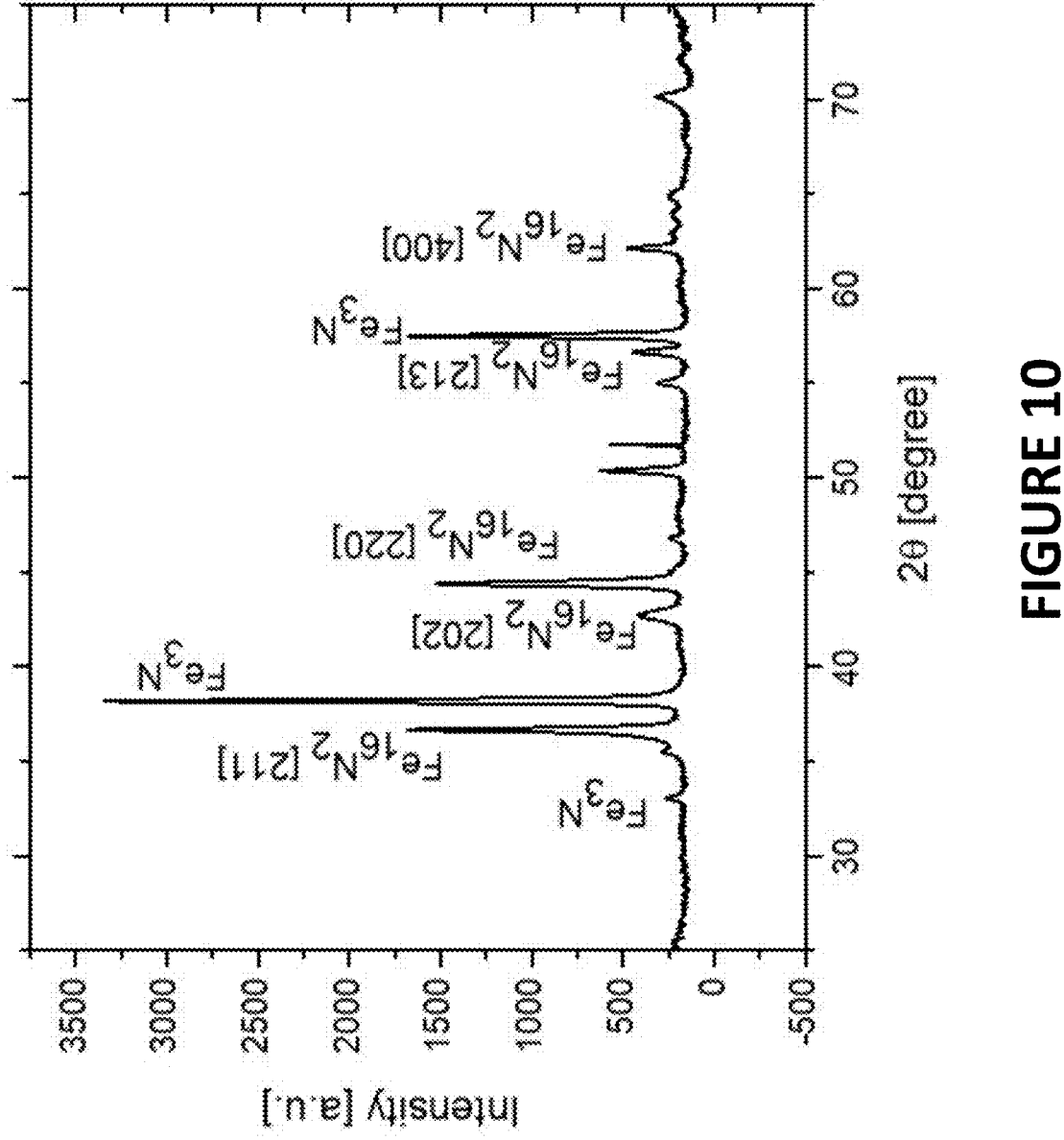
FIG. 10 shows the X-ray analysis confirming the $Fe_{16}N_2$ phase in the material.

FIG. 10 shows an X-ray analysis confirming a presence of $Fe_{16}N_2$ phase.

The invention claimed is:

1. An iron-nitride material having a polycrystalline microstructure including a plurality of elongated, plate-like crystallographic grains with grain boundaries, comprising an $\alpha''$-$Fe_{16}N_2$ phase and a body-center-tetragonal (bct) phase comprising Fe and N;
   wherein the peak height of the $Fe_{16}N_2$ (220) x-ray diffraction peak is greater than the peak height of the $Fe_{16}N_2$ (202) x-ray diffraction peak of the material.

2. The iron-nitride material according to claim 1, wherein at least one of the elongated, plate-like crystallographic grains has a grain aspect ratio of 1.5 or higher.

3. The iron-nitride material according to claim 1, wherein at least one of the elongated, plate-like crystallographic grains has a width in a range of from 100 nm to 500 nm and a length in a range of from 1 μm to 5 μm.

4. The iron-nitride material according to claim 1, wherein at least one of the elongated, plate-like crystallographic grains comprises a martensite structure.

5. The iron-nitride material according to claim 4, wherein the martensite structure comprises any of an $\alpha''$-$Fe_{16}N_2$ phase and a body-center-tetragonal (bct) phase comprising Fe and N.

6. The iron-nitride material according to claim 1, further comprising at least one of Cu and B.

7. The iron-nitride material according to claim 6, further comprising a composition of $Fe_xCu_yB_zAl_w$, wherein: y is in the range of from 1 wt % to 8 wt %, z is in the range of from about 0.01 wt % to about 3 wt %, Al is in the range of from 0.1 wt % to 10 wt %, and x is a remainder of the composition.

8. The iron-nitride material according to claim 1, further comprising an antiferromagnetic phase.

9. The iron-nitride material according to claim 8, wherein the antiferromagnetic phase comprises $Fe_xA_y$, wherein A is N, B, O or a combination thereof, wherein a ratio of x:y is in a range of from about 2:3 to about 3:1.

10. The iron-nitride material according to claim 1, further comprising:
   a body-centered distorted (BCT) region comprising one or more of the elongated, plate-like crystallographic grains with grain boundaries, wherein the one or more of the elongated, plate-like crystallographic grains comprises at least one of an $\alpha''$-$Fe_{16}N_2$ phase and a body-centered-tetragonal (bct) phase comprising Fe and N.

11. The iron-nitride material according to claim 10, wherein the BCT region comprises at least one of Ga, Al, P, N, O, B and C.

12. The iron-nitride material according to claim 10, wherein the BCT region is morphologically elongated so that one or more of the grain boundaries form at least in part planar grain boundaries.

13. The iron-nitride material according to claim 12, wherein the iron-nitride material has a crystallographic orientation with respect to a sample orientation parallel to at least one of the planar grain boundaries.

14. The iron-nitride material according to claim 1, wherein the iron-nitride material is in a form of any of strip, foil, ribbon, sheet and plate.

15. The iron-nitride material according to claim 1, wherein one or more dimensions of the iron-nitride material is 50 μm or more.

16. The iron-nitride material according to claim 1, wherein one or more dimensions of the iron-nitride material is 0.1 mm or more.

17. The iron-nitride material according to claim 1, wherein the material has a coercivity of 3 kOe or higher at room temperature.

18. The iron-nitride material according to claim 1, wherein the material has a coercivity of 5 kOe or higher at room temperature.

19. The iron-nitride material according to claim 1, wherein the material has a coercivity of 8 kOe or higher at room temperature.

20. The iron-nitride material according to claim 1, wherein the material has a coercivity of 10 kOe or higher at room temperature.

21. The iron-nitride material according to claim 1, wherein the material has a coercivity of 20 kOe or higher at room temperature.

22. The iron-nitride material according to claim 1, wherein the material has a coercivity of 30 kOe or higher at room temperature.

* * * * *